United States Patent
Kimura et al.

(10) Patent No.: US 11,874,574 B2
(45) Date of Patent: Jan. 16, 2024

(54) DISPLAY DEVICE

(71) Applicant: Japan Display Inc., Tokyo (JP)

(72) Inventors: Fumiya Kimura, Tokyo (JP); Isao Suzumura, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/085,595

(22) Filed: Dec. 21, 2022

(65) Prior Publication Data

US 2023/0205023 A1 Jun. 29, 2023

(30) Foreign Application Priority Data

Dec. 23, 2021 (JP) .................... 2021-209595

(51) Int. Cl.
*G02F 1/1362* (2006.01)
*G02F 1/1343* (2006.01)
*G02F 1/1333* (2006.01)

(52) U.S. Cl.
CPC .. *G02F 1/136222* (2021.01); *G02F 1/133345* (2013.01); *G02F 1/134345* (2021.01); *G02F 1/136227* (2013.01); *G02F 1/136286* (2013.01)

(58) Field of Classification Search
CPC ........ G02F 1/136222; G02F 1/134336; G02F 1/134345; G02F 1/136227; G02F 1/133345; G02F 1/136286; G02F 1/134363; G02F 1/1368; G02F 1/134318; G02F 1/136295; G02F 1/13685; G02F 2201/123; G02F 2201/40; H01L 27/1225; H01L 27/124; H01L 27/1255; H01L 29/78696

See application file for complete search history.

(56) References Cited

U.S. PATENT DOCUMENTS

| | | | |
|---|---|---|---|
| 2003/0013236 A1* | 1/2003 | Nakata | H01L 27/1248 438/149 |
| 2005/0122442 A1* | 6/2005 | Park | G02F 1/136227 349/43 |
| 2010/0001276 A1* | 1/2010 | Kim | G02F 1/136227 257/E27.06 |
| 2013/0153870 A1* | 6/2013 | Seo | H10K 50/858 257/40 |
| 2014/0104527 A1* | 4/2014 | Yang | G02F 1/136227 438/30 |
| 2014/0285744 A1* | 9/2014 | Son | G02F 1/136204 349/43 |
| 2016/0116797 A1* | 4/2016 | Itou | G02F 1/136227 349/41 |

(Continued)

FOREIGN PATENT DOCUMENTS

| | | | |
|---|---|---|---|
| JP | 2021-63897 A | | 4/2021 |
| KR | 20130054772 A | * | 5/2013 |
| WO | 2021/171714 A1 | | 9/2021 |

*Primary Examiner* — Hoan C Nguyen
(74) *Attorney, Agent, or Firm* — XSENSUS LLP

(57) ABSTRACT

According to one embodiment, a display device includes a signal line, a scanning line, a semiconductor layer, a first insulating layer which covers the semiconductor layer, a color filter above the first insulating layer, a pixel electrode above the color filter and a common electrode. The first insulating layer includes a first contact hole for connecting the semiconductor layer and the pixel electrode to each other. The first contact hole is provided at a position displaced from the color filter in plan view.

13 Claims, 7 Drawing Sheets

(56) References Cited

U.S. PATENT DOCUMENTS

| | | | |
|---|---|---|---|
| 2019/0056620 A1* | 2/2019 | Akiyoshi | H01L 27/124 |
| 2020/0285090 A1* | 9/2020 | Tanaka | H10K 59/40 |
| 2021/0109412 A1 | 4/2021 | Suzumura et al. | |
| 2022/0326581 A1 | 10/2022 | Kimura et al. | |

* cited by examiner

DISPLAY DEVICE

CROSS-REFERENCE TO RELATED APPLICATIONS

This application is based upon and claims the benefit of priority from Japanese Patent Application No. 2021-209595, filed Dec. 23, 2021, the entire contents of which are incorporated herein by reference.

FIELD

Embodiments described herein relate generally to a display device.

BACKGROUND

As an example of display devices, liquid crystal display devices are known, which comprise a pair of substrates and a liquid crystal layer disposed between the substrates. In liquid crystal display devices capable of color display, a color filter is provided on one of the pair of substrates.

In many cases, the color filter is provided on a counter substrate, which is different from an array substrate which comprises switching elements and pixel electrodes. On the other hand, a color-filter-on-array (COA) type liquid crystal display device has also been proposed, in which the color filter is provided on the array substrate.

In manufacturing of COA-type liquid crystal display devices, if the color filter is formed on a surface with large irregularities, voids may be created in the color filter due to the irregularities. Such voids can contribute to unevenness in display. Similar problems can also occur in other types of display devices in which a color filter is formed on an uneven surface.

DETAILED DESCRIPTION

Figure 1:
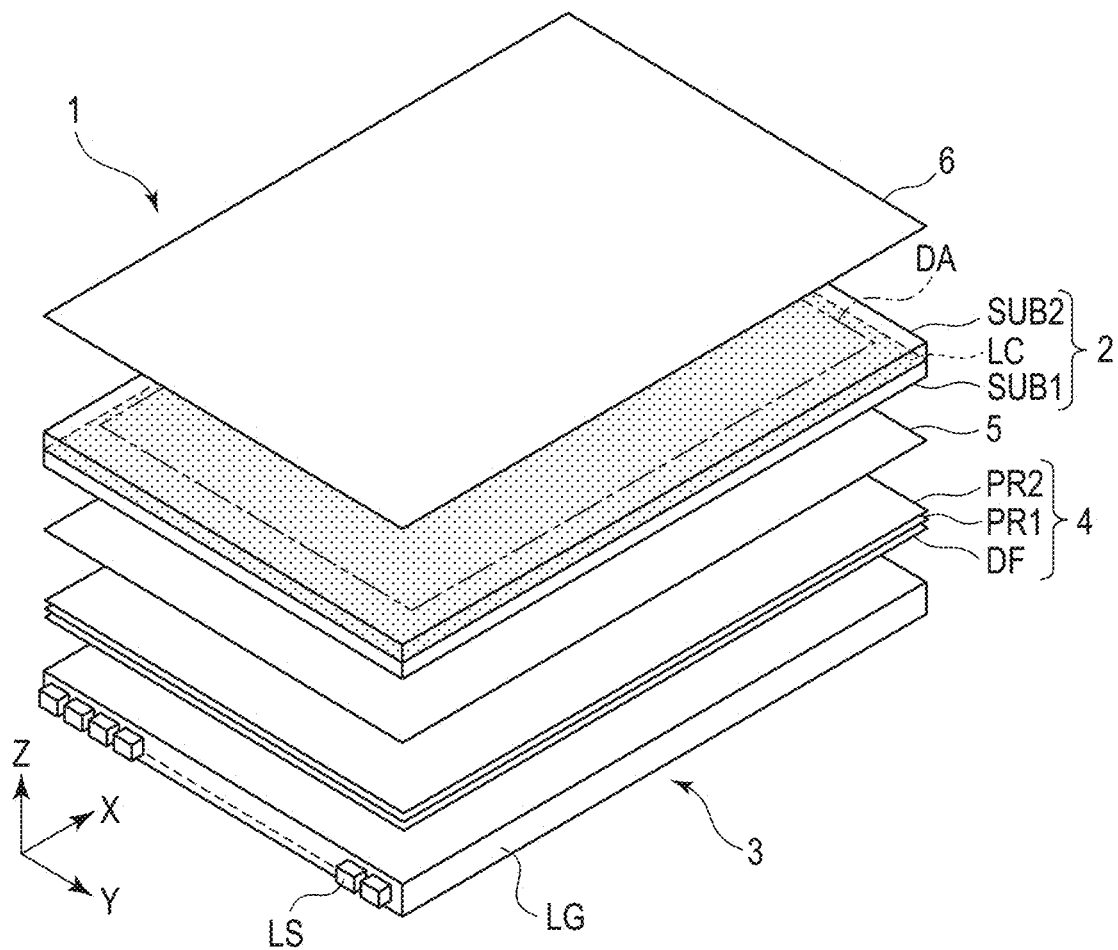
FIG. 1 is an exploded perspective view schematically showing a display device according to the first embodiment.

In general, according to one embodiment, a display device comprises a signal line to which a video signal is supplied, a scanning line intersecting the signal line, to which a scanning signal is supplied, a semiconductor layer connected to the signal line and at least partially opposing the scanning line, a first insulating layer which covers the semiconductor layer, a color filter disposed above the first insulating layer, a pixel electrode disposed above the color filter and opposing the color filter and a common electrode which forms an electric field according to a potential difference with respect to the pixel electrode. The first insulating layer includes a first contact hole for connecting the semiconductor layer and the pixel electrode to each other. The first contact hole is provided at a position displaced from the color filter in plan view.

According to a display device with such a configuration, generation of voids in the color filter can be suppressed.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

Each of the embodiments discloses a liquid crystal display device including a liquid crystal display element as an example. However, each embodiment does not preclude the application of individual technical concept disclosed therein to display devices with other types of display elements, such as organic electroluminescent display elements, micro-LEDs or mini-LEDs. The technical concepts disclosed in each embodiment can as well be applied to array substrates and electronic devices with sensor elements such as capacitive sensors, optical sensors and the like.

First Embodiment

FIG. 1 is an exploded perspective view schematically showing a liquid crystal display device 1 (to be referred to as a display device 1 hereinafter) according to the first embodiment. An X direction, a direction Y and a direction Z are defined as shown in the drawings. The X, Y, and Z directions are orthogonal to each other in this embodiment, but may intersect at angles other than right angles. The Z direction is equivalent to the thickness direction of the display device 1. Viewing the display device 1 and its elements in parallel with the Z direction is referred to as plan view. The direction indicated by the arrow along the Z direction may be referred to as upward and the opposite direction as downward.

The display device 1 includes a display panel 2 and a backlight 3. In the example shown in FIG. 1, the backlight 3 is of a side-edge type comprising a light guide LG opposing the display panel 2 and a plurality of light-emitting elements LS opposing a side surface of the light guide LG. The configuration of the backlight 3 is not limited to that of the example in FIG. 1, but can be of any configuration which supplies light necessary for image display.

In the example of FIG. 1, both the display panel 2 and the light guide LG are each formed into rectangular in shape with short sides along the X direction and long sides along the Y direction. The display panel 2 and light guide LG may be of some other shape without being limited to a rectangular shape.

The display panel 2 is a transmissive liquid crystal panel, which comprises a first substrate SUB1 (array substrate), a second substrate SUB2 (counter substrate) opposing the first substrate SUB1 and a liquid crystal layer (LC) sealed between these substrates SUB1 and SUB2. The display panel 2 includes a display area DA of, for example a rectangular shape.

Further, the display device 1 comprises an optical sheet group 4, a first polarizer 5 and a second polarizer 6. The optical sheet group 4 is disposed between the light guide LG and the display panel 2. For example, the optical sheet group 4 includes a diffusion sheet DF which diffuses light emitted from the light guide LG, a first prism sheet PR1 and a second prism sheet PR2, on which a number of prisms are formed.

The first polarizer 5 is disposed between the optical sheet group 4 and the first substrate SUB1. The second polarizer 6 is disposed above the second substrate SUB2. The polarization axis of the first polarizer 5 and the polarization axis of the second polarizer 6 are in a cross-Nicol relationship, which is orthogonal to each other.

The display device 1 can be used, for example, in various devices such as in-vehicle equipment, smartphones, tablet terminals, mobile phone terminals, personal computers, TV receivers, game devices, even head-mounted displays.

Figure 2:
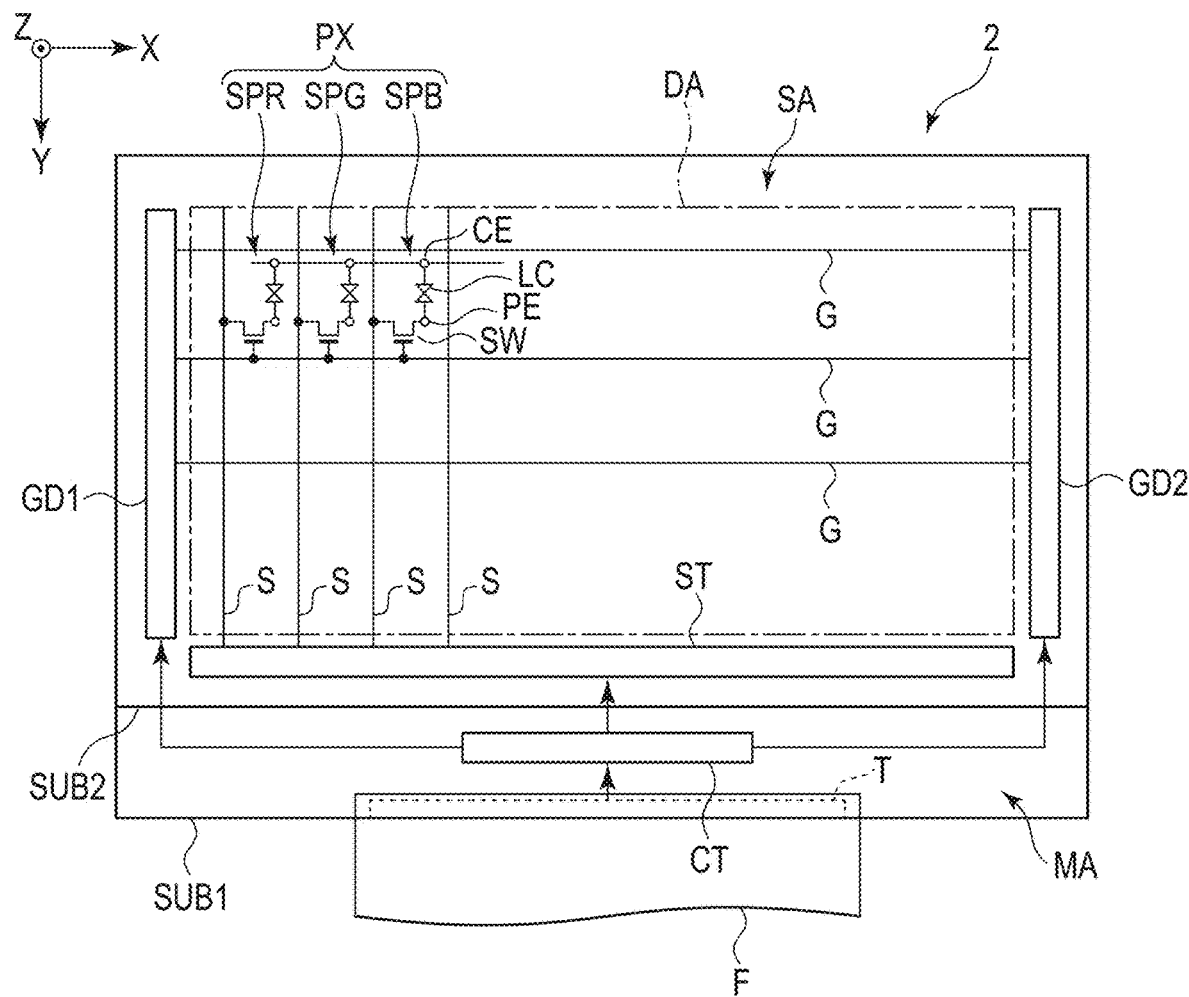
FIG. 2 is a plan view schematically showing a display panel.

FIG. 2 is a schematic plan view of the display panel 2. The display panel 2 includes a display area DA and a surrounding peripheral area SA. In the example shown in FIG. 2, a lower side of the first substrate SUB1 protrudes further from the second substrate SUB2 in the Y direction. With this configuration, the first substrate SUB1 includes a mount area MA formed therein, which does not overlap the second substrate SUB2. The mount area MA is a part of the peripheral area SA.

In the display area DA, a plurality of pixels PX are arranged in a matrix. The pixels PX each include a plurality of sub-pixels. As an example in this embodiment, the pixel PX contains a red sub-pixel SPR, a green sub-pixel SPG and a blue secondary pixel SPB. But, the pixel PX may as well contain a sub-pixel of some other color such as white.

The display panel 2 comprises a plurality of scanning lines G, a plurality of signal lines S (video lines), a first scan driver GD1, a second scan driver GD2 and a selector circuit ST. The scanning lines G each extend along the X direction and are aligned along the Y direction. The signal lines S each extend along the Y direction and are aligned along the X direction. Each scan line G is connected to the first scan driver GD1 and the second scan driver GD2. Each signal line S is connected to the selector circuit ST.

In the example shown in FIG. 2, the controller CT is mounted in the mount area MA. Further, a terminal T is provided in the mount area MA, and a flexible circuit board F is connected to the terminal T. The controller CT may be mounted on the flexible circuit board F. The controller CT can be constituted by an IC or various types of circuit elements.

The flexible circuit board F inputs various signals to the controller CT, which are sent from a board or the like of an electronic device on which the display device 1 is mounted. Based on the input signals, the controller CT supplies video signals to the selector circuit ST, and controls the first scan driver GD1, the second scan driver GD2 and the selector circuit ST. The scan drivers GD1 and GD2 supply scanning signals sequentially to each scan line G. The selector circuit ST supplies the input video signals sequentially to the signal lines S.

Each of the sub-pixels SPR, SPG and SPB includes a pixel electrode PE, a switching element SW (thin-film transistor) and a common electrode CE to which a common voltage is applied. The switching element SW is connected to the pixel electrode PE, a scanning line G and a signal line S, and when a scanning signal is supplied to the scanning line G, a video signal of the signal line S is supplied to the pixel electrode PE. The common electrode CE is formed over multiple sub-pixels. When the video signal is supplied to the pixel electrode PE, a potential difference is created between the pixel electrode PE and the common electrode CE, and an electric field corresponding to this potential difference acts on the liquid crystal layer LC.

In this embodiment, the scanning line G, the signal line S, the first scan driver GD1, the second scan driver GD2, the selector circuit ST, the switching element SW, the pixel electrode PE and the common electrode CE are all formed in the first substrate SUB1.

Figure 3:
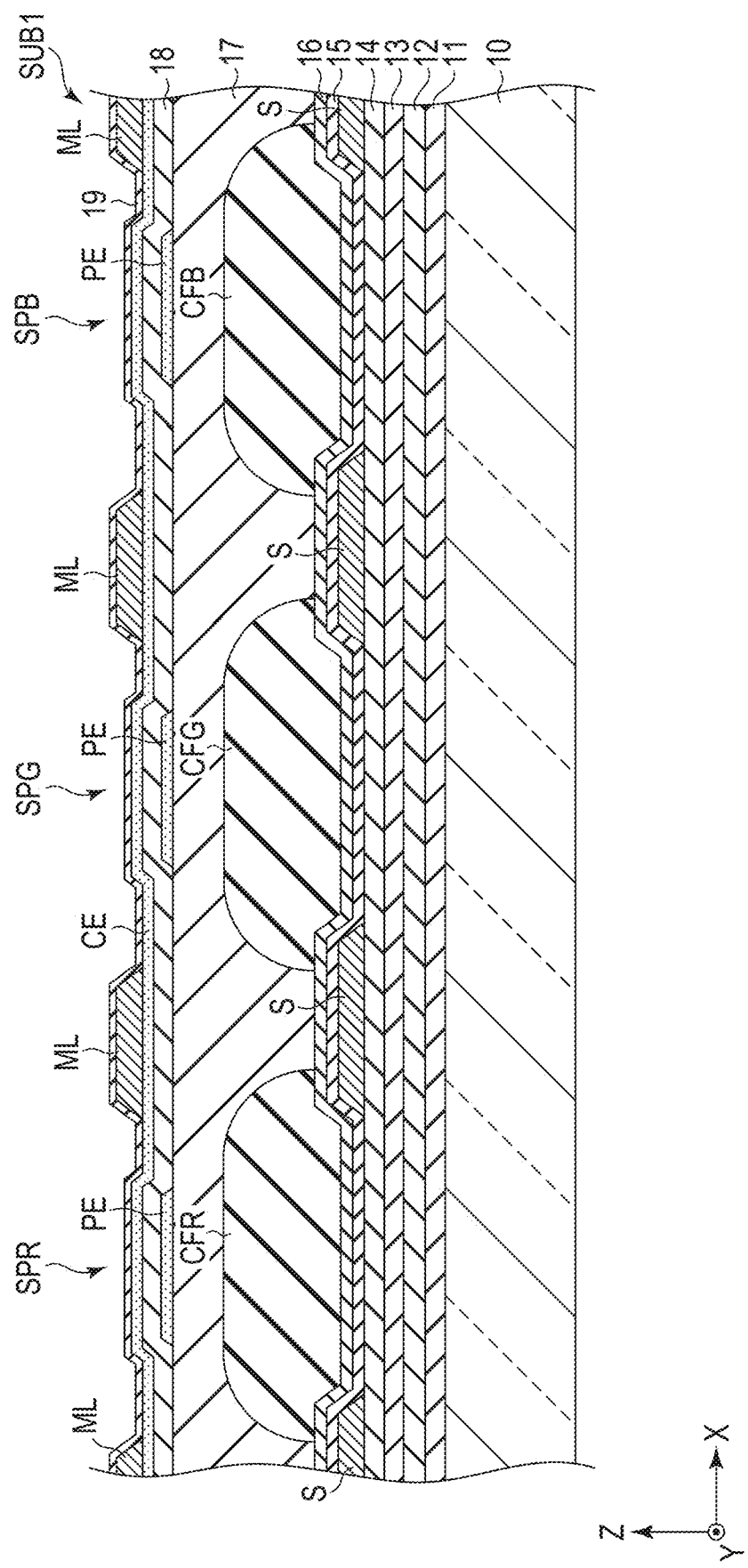
FIG. 3 is a cross-sectional view schematically showing a first substrate according to the first embodiment.

FIG. 3 is a cross-sectional view schematically showing the first substrate SUB1. This cross-sectional view corresponds to that taken along line III-III in FIG. 4, which will be described later. The substrate SUB1 comprises a base 10. The base 10 can be formed of, for example, glass or a resin material such as polyimide.

Further, the first substrate SUB1 comprises insulating layers 11 to 18, an alignment film 19, color filters CFR, CFG and CFB and a metal layer ML. The cross section in FIG. 3 shows the signal lines S, the pixel electrodes PE and the common electrode CE, described above.

The insulating layers 11 to 14 are stacked on the base 10 in the order. The signal lines S are each disposed at a boundary of each respective pair of sub-pixels adjacent to each other along the X direction on the insulating layer 14. The insulating layer 15 covers the signal lines S and the insulating layer 14. The insulating layer 16 covers the insulating layer 15.

The color filter CFR is disposed on the insulating layer 16 in the sub-pixel SPR. The color filter CFG is disposed on the insulating layer 16 in the sub-pixel SPG. The color filter CFB is disposed on the insulating layer 16 in the sub-pixel SPB. When light from the backlight 3 passes through the color filter CFR, red transmission light is generated, when the light passes through the color filter CFG, green transmission light is generated, and when the light passes through the color filter CFB, blue transmission light is generated.

The insulating layer 17 covers the color filters CFR, CFG and CFB and the insulating layer 16. The insulating layer 17 is formed thicker than the other insulating layers 11 to 16 and 18 and serves as a planarization layer to planarize the irregularities created by the color filters CFR, CFG and CFB and the like.

The pixel electrodes PE are disposed on the insulating layer 17 in each of the sub-pixels SPR, SPG and SPB. The insulating layer 18 covers the pixel electrodes PE and the insulating layer 17. The common electrode CE covers the insulating layer 18. The metal layers ML are each disposed on the common electrode CE at the respective boundary between each respective sub-pixels adjacent to each other along the X direction so as to oppose the signal lines S, respectively. To the metal layers ML, the same common voltage as that of the common electrode CE is applied. The metal layers ML lower the resistance of the common electrode CE and suppresses the reflection of external light by the signal lines S and the like. The alignment film 19 covers the metal layers ML and the common electrode CE.

Although not illustrated in the cross-section of FIG. 3, the common electrode CE comprises a slit in each of the sub-pixels SPR, SPG and SPB. Through these slits, an electric field acting on the liquid crystal layer LC is formed between the pixel electrodes PE and the common electrode CE.

The insulating layers 11 to 16 and 18 can be formed of an inorganic material such as silicon nitride or silicon oxide. The insulating layer 17 is an example of an organic insulating layer formed of an organic material such as acrylic resin. The alignment film 19 can be formed of polyimide. The color filters CFR, CFG, and CFB can be each formed from, for example, a negative resist.

The pixel electrodes PE and the common electrode CE can be formed of a transparent conductive material such as indium tin oxide (ITO). The signal lines S, the metal layers ML and the scanning lines G shown in FIG. 1 can be formed of a metallic material. The signal lines S, the metal layers ML and the scanning lines G each may have a single-layer structure formed of a single metal material or a multilayer structure in which different types of metallic materials are stacked one on another.

The structure of the first substrate SUB1 is not limited to that of the example in FIG. 3. For example, the metal layers ML each may be disposed between the common electrode CE and the insulating layer 18. Further, the pixel electrodes PE may be disposed above the common electrode CE (on a liquid crystal layer LC side).

The second substrate SUB2 includes a base and an alignment film similar to those of the first substrate SUB1. Preferably, the second substrate SUB2 does not include a light-shielding layer such as the so-called black matrix. With this configuration, even if the first substrate SUB1 and the second substrate SUB 2 are displaced from each other when they are adhered together, excellent display quality of the display device 1 can be maintained.

Figure 4:
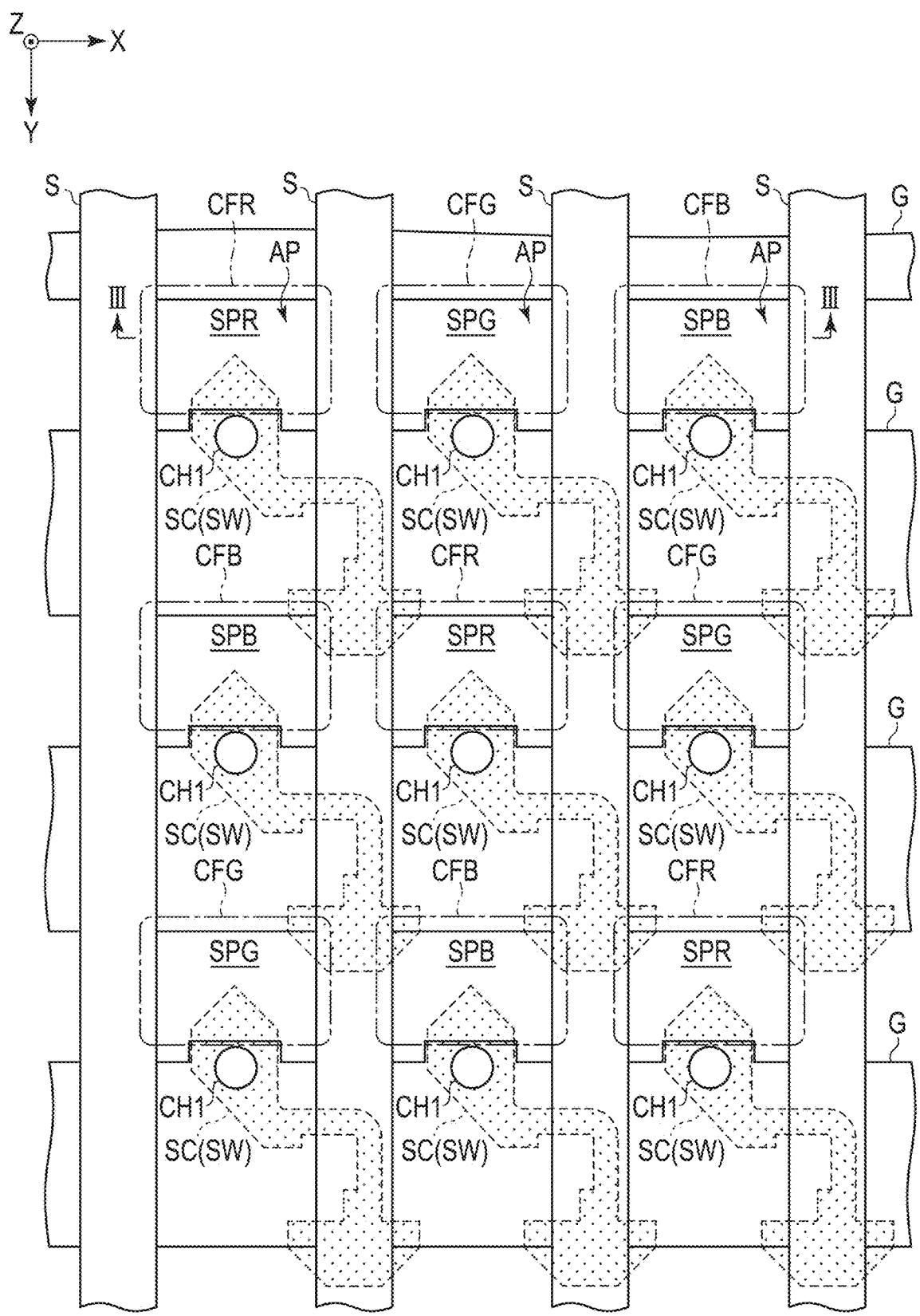
FIG. 4 is a plan view schematically showing some of elements provided on the first substrate of the first embodiment.

FIG. 4 is a plan view schematically showing some of the elements provided on the first substrate SUB1. This figure shows an example of the shapes applicable to the scanning lines G, the signal lines S, the switching elements SW, and the color filters CFR, CFG and CFB.

In the example in FIG. 4, the scanning lines G extend linearly along the X direction and the signal lines S extend linearly along the Y direction. The width of the scanning lines G along the Y direction is greater than the width of the signal lines S along the X direction. Note that the scanning lines G and the signal lines S do not necessarily have to be linear but may include a bent portion.

A plurality of areas enclosed by each adjacent pair of scanning lines G and each adjacent pair of signal lines S are equivalent to aperture areas AP of the sub-pixels SPR, SPG and SPB, respectively. In the example in FIG. 4, the sub-pixels SPR, SPG and SPP are aligned in order in the X direction. With such an arrangement, columns each including a plurality of sub-pixels SPR arranged along a diagonal direction which intersects the X direction and the Y direction, columns each including a plurality of sub-pixels SPG arranged along the diagonal direction and columns each including a plurality of sub-pixels SPB arranged along the diagonal direction are alternately formed in the display area DA.

In the sub-pixels SPR, SPG and SPB, island-shaped color filters CFR, CFG and CFB are disposed, respectively. The color filters CFR, CFG and CFB overlap the aperture areas AP of the sub-pixels SPR, SPG and SPB, respectively.

The switching elements SW each include a semiconductor layer SC of, for example, an oxide semiconductor or the like. In FIG. 4, the location of a first contact hole CH1 used to connect the semiconductor layer SC and the respective pixel electrode discussed above, is illustrated as well.

Figure 5:
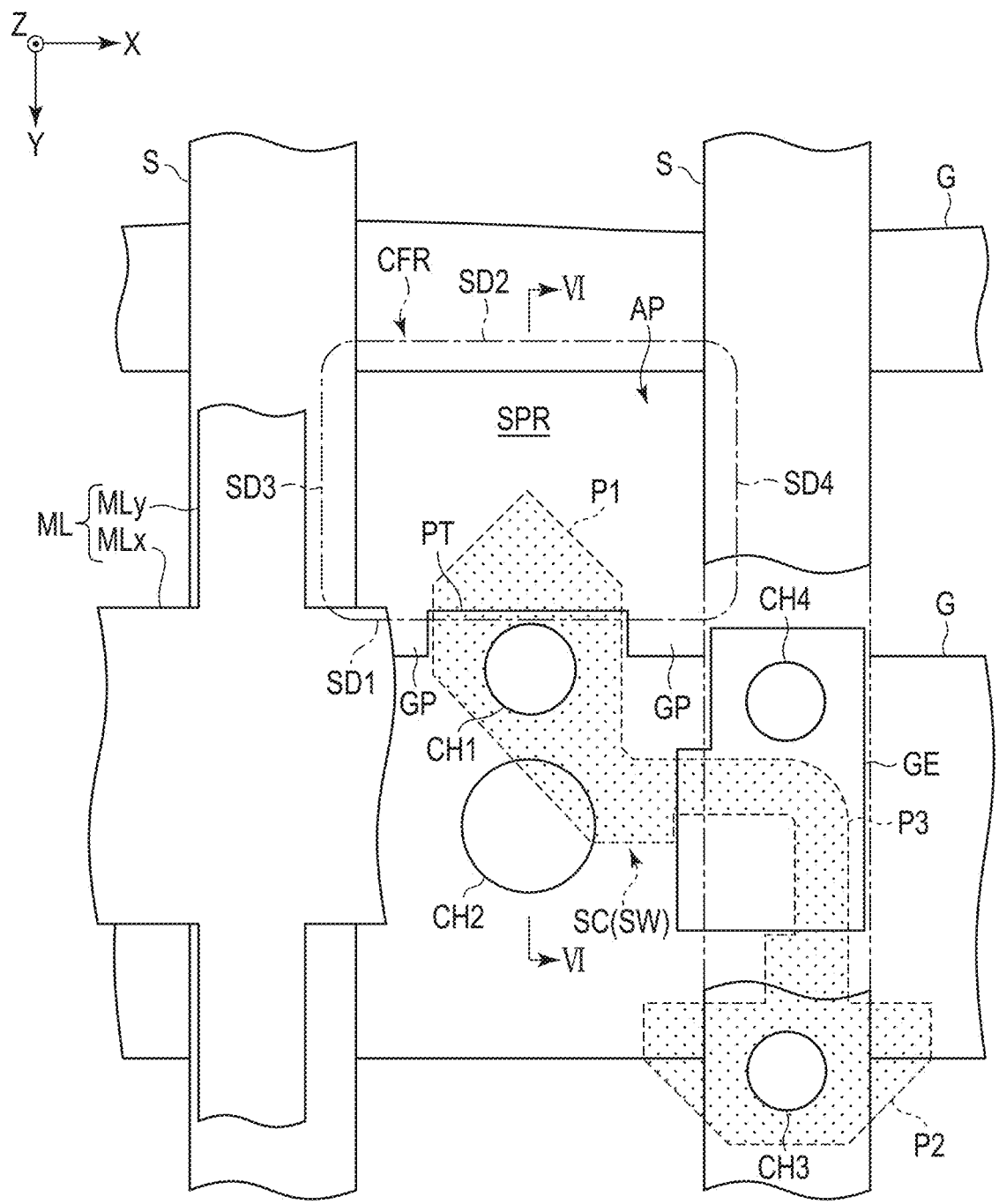
FIG. 5 is a plan view schematically showing a sub-pixel and its surrounding structure according to the first embodiment.
Figure 6:
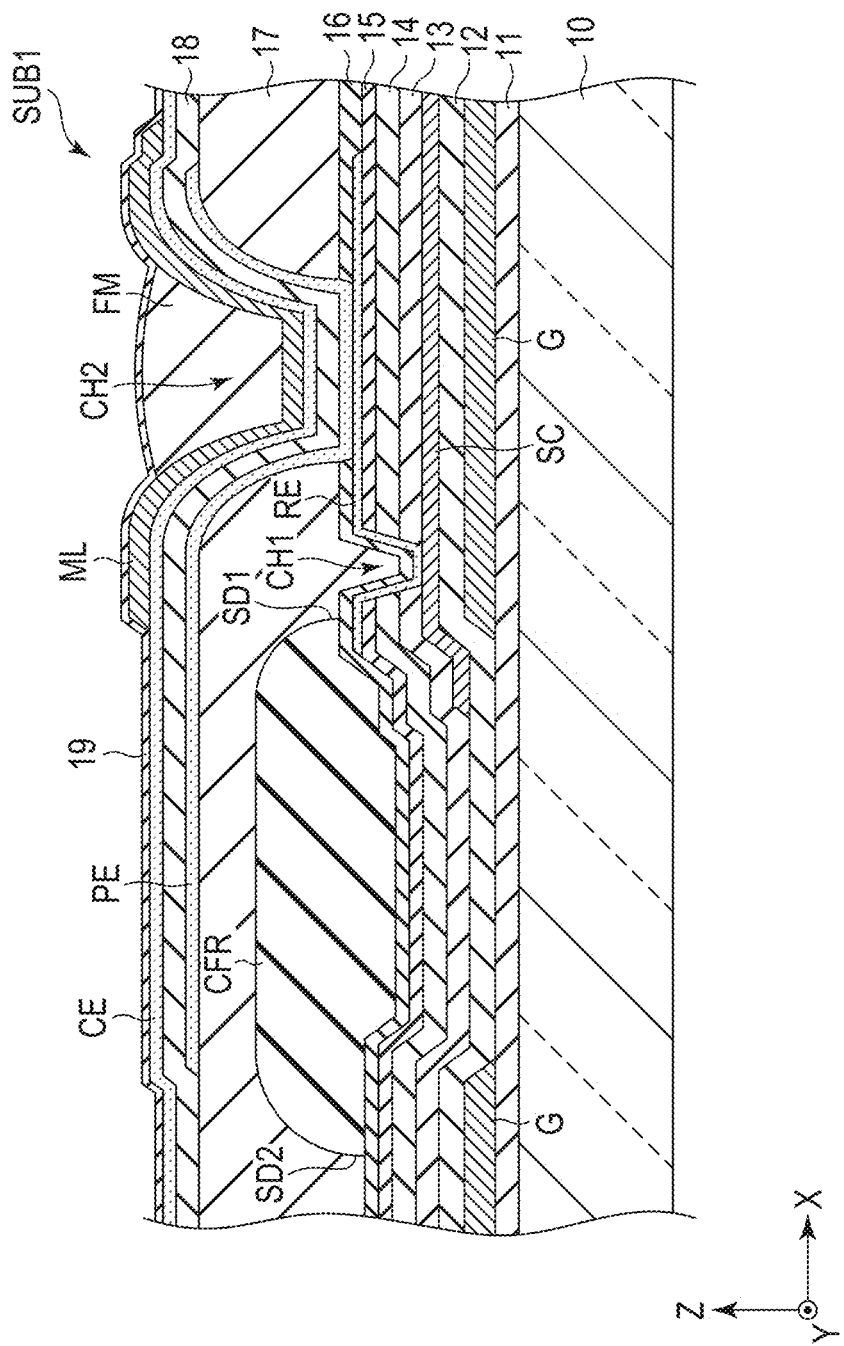
FIG. 6 is a cross-sectional view schematically showing the first substrate taken along line VI-VI in FIG. 5.

FIG. 5 is a plan view schematically showing the sub-pixel SPR and its surrounding structure. FIG. 6 is a cross-sectional view schematically showing the first substrate SUB1 taken along line VI-VI in FIG. 5. Note that the sub-pixels SPG and SPB as well have a structure similar to that of the sub-pixel SPR shown in FIGS. 5 and 6.

In the example of FIG. 5, the scanning lines G each include a protruding portion PT protruding into the respective aperture area AP toward the color filter CFR. The semiconductor layer SC includes a first portion P1 overlapping the protruding portion PT, a second portion P2 overlapping the respective signal line S which supplies the video signal to the sub-pixel SPR, and a third portion P3 connecting the first portion P1 and the second portion P2 to each other. A part of the first portion P1 extends out to the respective aperture area AP.

In FIG. 5, a part of the signal line S on the right side is illustrated by broken lines. At the position overlapping the signal line S, the scanning line G and the third portion P3, an island-shaped gate electrode GE is disposed.

Further, a part of the metal layer ML is shown in FIG. 5. For example, the metal layers ML are arranged as a lattice shape including a plurality of line portions MLx extending along the X direction and a plurality of line portions MLy extending along the Y direction. The line portions MLx overlap the scanning lines G, and the line portions MLy overlap the signal lines S.

In the example shown in FIG. 5, the width of the line portions MLx along the Y direction is less than the width of the scanning lines G along the Y direction. Further, the width of the line portions MLy along the X direction is less than the width of the signal lines S along the X direction. As another example, the line portions MLx may have a width greater than that of the scanning lines G and entirely overlap the scanning lines G. Further, the line portions MLy may have a width greater than that of the signal lines S and entirely overlap the signal lines S.

As shown in FIG. 6, the scanning lines G are disposed on the insulating layer 11 and covered by the insulating layer 12. The semiconductor layer SC is disposed on the insulating layer 12 and covered by the insulating layer 13. Although not shown in the cross section in FIG. 6, the gate electrode GE is disposed on the insulating layer 13 and covered by the insulating layer 14. In other words, the third portion P3 is located between the respective scanning line G and the gate electrode GE along the Z direction.

As shown in FIG. 6, the first contact hole CH1 penetrates the insulating layer 13 to 15 (the first insulating layer). The first substrate SUB1 further comprises a relay electrode RE disposed on the insulating layer 15 and covered by the insulating layer 16. The relay electrode RE is in contact with the semiconductor layer SC (the first portion P1) via the first contact hole CH1. The relay electrode RE can be formed of a transparent conductive material such as ITO, for example.

Due to the first contact hole CH1, a depression is formed in the surface of the insulating layer 16. In the depression, a part of the insulating layer 17 (the second insulating layer) is located. In other words, the insulating layer 17 fills at least partially the first contact hole CH1.

The pixel electrode PE is in contact with the relay electrode RE via a second contact hole CH2 which penetrates the insulating layers 16 and 17. The insulating layer 17 is thicker than the insulating layers 14 to 16, and therefore the second contact hole CH2 is larger in diameter than the first contact hole CH1. In the example in FIG. 6, a filling material FM which fills at least partially the depression created by the second contact hole CH2 is provided. The filling material FM is disposed on the metal layer ML and covered by the alignment film 19. A part of the common electrode CE is located between the filling material FM and the pixel electrode PE inside the second contact hole CH2.

As shown in FIG. 5, the first contact hole CH1 and the second contact hole CH2 overlap with the respective scanning line G and the respective metal layer ML (a linear portion MLx). At least a part of the first contact hole CH1 overlaps the protruding portion PT.

In the example of FIG. 5, the first contact hole CH1 and the second contact hole CH2 are aligned along the Y direction. The first contact hole CH1 is located between the second contact hole CH2 and the aperture area AP.

The second portion P2 of the semiconductor layer SC is in contact with the respective signal line S via a third contact hole CH3. The gate electrode GE is in contact with the respective scanning line G via a fourth contact hole CH4. Although not shown in the cross section of FIG. 6, the third contact hole CH3 penetrates the insulating layers 13 and 14, and the fourth contact hole CH4 penetrates the insulating layers 12 and 13.

In the example of FIG. 5, the color filter CFR has such a shape that the width along the X direction is greater than the width along the Y direction.

Similarly, the aperture area AP has such a shape that the width along the X direction is greater than the width along the Y direction. For example, at least one of the width along the X direction and the width along the Y direction of the color filter CFR is 10 μm or less, and in a display device 1 of a higher resolution, it is 7 μm or less. Note that the shapes of the color filter CFR and the aperture area AP are not limited to those of the example in FIG. 5.

The color filter CFR has a first side SD1, a second side SD2, a third side SD3 and a fourth side SD4. The first side SD1 and the second side SD2 are substantially parallel to the X direction. The third side SD3 and the fourth side SD4 are substantially parallel to the Y direction.

The first side SD1 is located between the first contact hole CH1 and the tip end of the protruding portion PT along the Y direction. The second side SD2 overlaps the scanning line G shown in the upper portion of FIG. 5. The third side SD3 overlaps the signal line S on the left-hand side in FIG. 5. The fourth side SD4 overlaps with the signal line S on the right-hand side in FIG. 5.

The color filter CFR overlaps most of the aperture area AP. The color filter CFR overlaps the tip portion of the protruding portion PT and a part of the first portion P1 of the semiconductor layer SC. On respective sides of the protruding portion PT, gaps GP are formed between the color filter CFR and the scanning line G along the Y direction. The gaps GP are part of the aperture area AP. The gaps GP overlap the linear portion MLx of the metal layer ML.

As described above, in this embodiment, the first contact hole CH1 is provided at a position displaced from the color filter CFR in plan view. Specifically, the first contact hole CH1 is located between the color filter CFR and the second contact hole CH2 in plan view. The relationships among the first contact hole CH1, the second contact hole CH2, the color filters CFG and CFB in the sub-pixels SPG and SPB are similar to that described above.

For example, the color filters CFR, CFG and CFB are formed by applying a resist, which is the material for these, on the insulating layer 16, and then exposing and developing this resist. When the color filters CFR, CFG and CFB overlap the first contact hole CH1, a part of the resist applied on the insulating layer 16 enters the inside of the contact hole CH1.

The part of the above-described resist that enters inside the first contact hole CH1 may not be exposed well, and if the exposure is insufficient, voids (bubbles) may be generated in the part after development. Such voids can be a factor of non-uniformity in display.

By contrast, when the color filters CFR, CFG, and CFB do not overlap the first contact hole CH1 as in the present embodiment, lower surfaces of the color filters CFR, CFG and CFB are substantially flat. Therefore, the generation of the above-described voids is suppressed, and as a result, the display quality of the display device 1 is improved.

In this embodiment, the scanning lines G each include a protruding portion PT, and the first contact hole CH1 overlaps the protruding portion PT. As a result, the light emitted from the backlight 3 toward the semiconductor layer SC in the vicinity of the first contact hole CH1 is blocked, and the generation of leakage current in the semiconductor layer SC is suppressed.

Further, in this embodiment, the gaps GP formed on respective sides of the protruding portion PT overlap the metal layer ML. Thus, the leaking of the light from the backlight 3 passing through the gaps GP (light not passing through the color filters CFR, CFG and CFB) can be suppressed.

In addition to the above, various other advantageous effects can be obtained from this embodiment.

Second Embodiment

The second embodiment will now be described. Detailed descriptions on a configuration similar to that of the first embodiment will be omitted.

Figure 7:
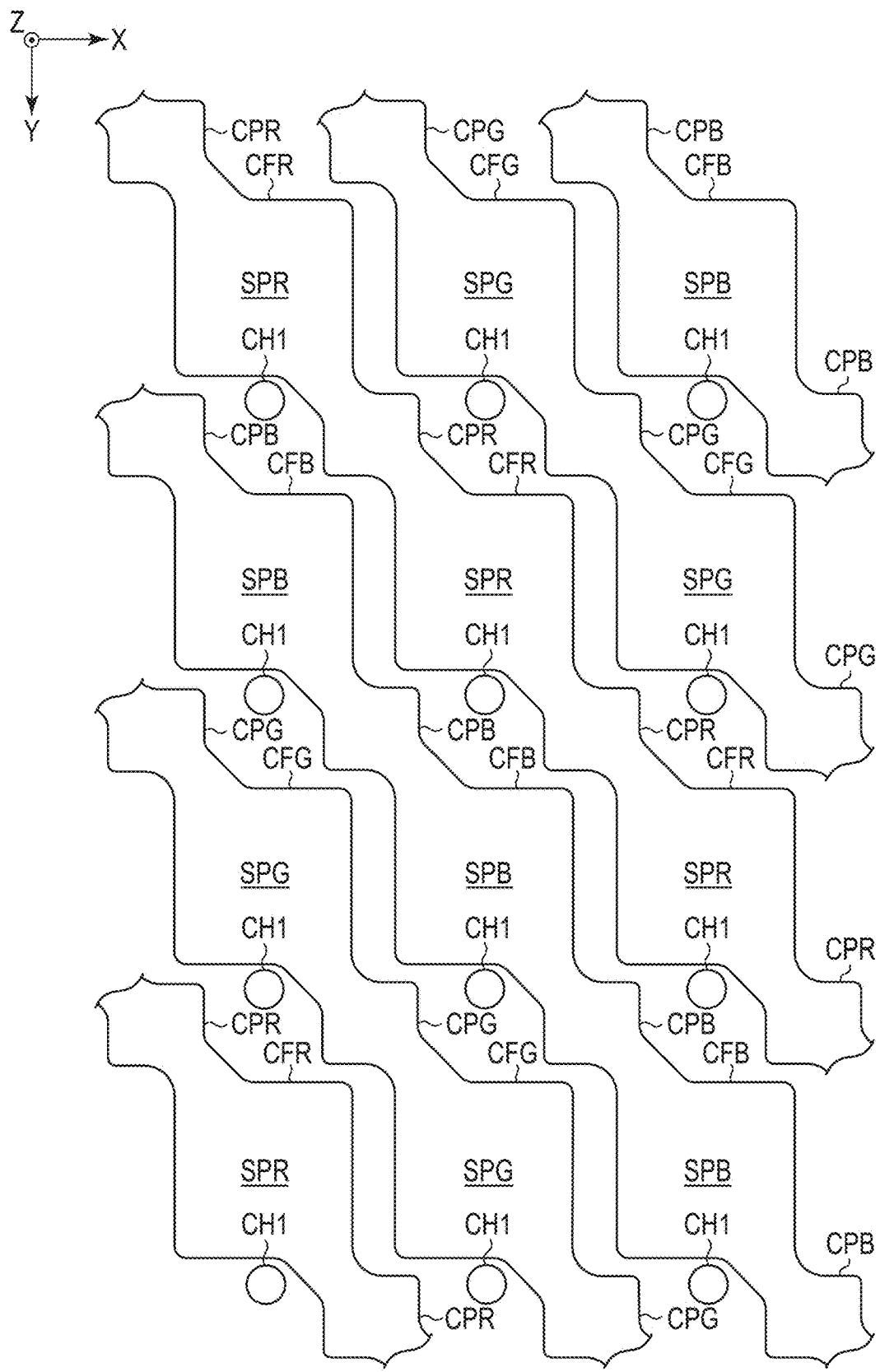
FIG. 7 is a plan view schematically showing a color filter and a first contact hole according to the second embodiment.

FIG. 7 is a plan view schematically showing color filters CFR, CFG and CFB and a first contact hole CH1 according to the second embodiment. The arrangement of sub-pixels SPR, SPG and SPB is similar to that of the example in FIG. 3.

In the example of FIG. 7, each adjacent pair of color filters CFR are connected to each other by a connection portion CPR, each adjacent pair of color filters CFG are connected to each other by a connection portion CPG, and each adjacent pair of color filters CFB are connected to each other by a connection portion CPB. The connection portion CPR is formed of the same material as that of the color filter CFR, the connection portion CPG is formed of the same material as that of the color filter CFG, and the connection portion CPB is formed of the same material as that of the color filter CFB.

Each of the connection portions CPR, CPG and CPB is smaller in size than the color filters CFR, CFG and CFB, and has a shape whose width of the middle portion thereof is expanded. But, the shape of the connection portions CPR, CPG and CPB is not limited to that of this example.

In the example of FIG. 7, the connection portion CPR is spaced apart from the color filters CFG and CFB adjacent thereto, the connection portion CPG is spaced apart from the color filters CFR and CFB adjacent thereto, and the connection portion CPB is spaced apart from the color filters CFR and CFG adjacent thereto. As another example, the connection portion CPR may be in contact with at least one of the color filters CFG and CFB adjacent thereto, the connection portion CPG may be in contact with at least one of the color filters CFR and CFB adjacent thereto, and the connection portion CPB may be in contact with at least one of the adjacent color filters CFR and CFG.

The first contact hole CH1 of each of the sub-pixels SPR, SPG and SPB is located in a position displaced from the respective one of the color filters CFR, CFG and CFB and the connection portions CPR, CPG and CPB.

With the connection portions CPR, CPG and CPB provided as in the present embodiment, the color filters CFR, CFG and CFB are less likely to be peeled off from the surfaces on which they are formed, as compared to the case where the color filters CFR, CFG and CFB are formed into an island shape as disclosed in the first embodiment. With this configuration, it is possible to improve the yield of the display device 1.

Further, since the first contact holes CH1 does not overlap the respective connection portions CPR, CPG and CPB, it is possible to suppress the generation of voids in the connection portions CPR, CPG and CPB as well.

Based on the display device which has been described in the above-described embodiments, a person having ordinary skill in the art may achieve a display device with an arbitral design change; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step or a condition to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

What is claimed is:

1. A display device comprising:
   a signal line to which a video signal is supplied;
   a scanning line intersecting the signal line, to which a scanning signal is supplied;
   a semiconductor layer connected to the signal line and at least partially opposing the scanning line;
   a first insulating layer which covers the semiconductor layer;
   a color filter disposed above the first insulating layer;
   a pixel electrode disposed above the color filter and opposing the color filter; and
   a common electrode which forms an electric field corresponding to a potential difference with respect to the pixel electrode,
   wherein
   the first insulating layer comprises a first contact hole for connecting the semiconductor layer and the pixel electrode,
   the first contact hole is provided at a position displaced from the color filter in plan view,
   the display device further comprises:
      a plurality of sub-pixels each including the semiconductor layer, the color filter, the pixel electrode and the first contact hole; and
      a connection portion connecting the color filters of the plurality of sub-pixels, and
   each of the first contact holes of the plurality of sub-pixels is provided at a position displaced from the respective connection portion in plan view.

2. The display device of claim 1, further comprising:
   a second insulating layer which covers the color filter,
   wherein
   the second insulating layer fills at least partially the first contact hole.

3. The display device of claim 2, further comprising:
   a relay electrode located between the first insulating layer and the second insulating layer in a thickness direction and in contact with the semiconductor layer via the first contact hole,
   wherein
   the second insulating layer comprises a second contact hole penetrating to the relay electrode, and
   the pixel electrode is in contact with the relay electrode via the second contact hole.

4. The display device of claim 3, wherein
   the first contact hole is located between the color filter and the second contact hole in plan view.

5. The display device of claim 3, wherein
   the second contact hole has a diameter greater than that of the first contact hole.

6. The display device of claim 3, further comprising:
   a filling material that fills at least partially a depression created due to the second contact hole.

7. The display device of claim 6, wherein
   a part of the common electrode is located between the filling material and the pixel electrode inside the second contact hole.

8. The display device of claim 1, wherein
   a gap is created between the color filter and the scanning lines in plan view.

9. The display device of claim 8, further comprising:
   a metal layer to which a voltage equal to that applied to the common electrode is applied,
   wherein
   the gap overlaps the metal layer in plan view.

10. The display device of claim 9, wherein
    the metal layer overlaps the first contact hole in plan view.

11. The display device of claim 1, wherein
    the scanning line includes a protruding portion protruding toward the color filter in plan view, and
    the first contact hole overlaps the protruding portion in plan view.

12. The display device of claim 11, wherein
    a tip end of the protruding portion overlaps the color filter in plan view.

13. The display device of claim 1, comprising:
    a first substrate including the signal line, the scanning line, the semiconductor layer, the first insulating layer, the color filter, the pixel electrode and the common electrode;
    a second substrate opposing the first substrate; and
    a liquid crystal layer between the first substrate and the second substrate.

* * * * *